(12) United States Patent
Attinella et al.

(10) Patent No.: US 8,201,027 B2
(45) Date of Patent: Jun. 12, 2012

(54) VIRTUAL FLIGHT RECORDER HOSTED BY SYSTEM TRACING FACILITY

(75) Inventors: John Michael Attinella, Rochester, MN (US); Larry J. Cravens, Pine Island, MN (US); Michael James Denney, Byron, MN (US); Edwin C. Grazier, Stewartville, MN (US); Jay Paul Kurtz, Rochester, MN (US); David Ferguson Legler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1931 days.

(21) Appl. No.: 11/211,951

(22) Filed: Aug. 25, 2005

(65) Prior Publication Data

US 2007/0050683 A1 Mar. 1, 2007

(51) Int. Cl.
*G06F 11/00* (2006.01)
(52) U.S. Cl. .............. 714/47.1; 714/30; 714/31; 714/45; 714/46; 714/57
(58) Field of Classification Search .............. 714/30, 714/31, 45, 46, 47.1, 57
See application file for complete search history.

(56) References Cited

U.S. PATENT DOCUMENTS

| | | | | |
|---|---|---|---|---|
| 5,684,945 A * | 11/1997 | Chen et al. | ....................... | 714/20 |
| 5,748,881 A * | 5/1998 | Lewis et al. | ..................... | 714/47 |
| 5,935,262 A * | 8/1999 | Barrett et al. | ................... | 714/46 |
| 6,073,255 A * | 6/2000 | Nouri et al. | ..................... | 714/31 |
| 6,148,381 A * | 11/2000 | Jotwani | .......................... | 711/158 |
| 6,282,673 B1 * | 8/2001 | Liu et al. | ......................... | 714/25 |
| 6,282,701 B1 | 8/2001 | Wygodny | | |
| 6,351,724 B1 * | 2/2002 | Klassen et al. | ................. | 702/186 |
| 6,467,052 B1 * | 10/2002 | Kaler et al. | ...................... | 714/39 |
| 6,477,667 B1 * | 11/2002 | Levi et al. | ........................ | 714/57 |
| 6,633,782 B1 * | 10/2003 | Schleiss et al. | ................. | 700/26 |
| 6,654,915 B1 * | 11/2003 | Lu et al. | .......................... | 714/57 |
| 6,671,830 B2 * | 12/2003 | Lowell et al. | .................... | 714/39 |
| 6,834,365 B2 * | 12/2004 | Bardsley et al. | ................ | 714/45 |
| 6,968,341 B2 * | 11/2005 | Hand et al. | ...................... | 707/102 |
| 7,028,228 B1 * | 4/2006 | Lovy et al. | ....................... | 714/57 |
| 7,246,300 B1 * | 7/2007 | Au et al. | ......................... | 714/758 |
| 7,284,153 B2 * | 10/2007 | Okbay et al. | .................... | 714/30 |
| 7,380,172 B2 * | 5/2008 | Srinivas et al. | ................. | 714/38 |
| 2003/0204588 A1 * | 10/2003 | Peebles et al. | ................. | 709/224 |
| 2005/0228880 A1 * | 10/2005 | Champlin | ..................... | 709/224 |
| 2006/0041794 A1 * | 2/2006 | Aaron | .............................. | 714/47 |
| 2006/0294439 A1 * | 12/2006 | Rolia et al. | ....................... | 714/47 |

OTHER PUBLICATIONS

The Flight Recorder: An Architectural Aid for System Monitoring. Michael M. Gorlick 1991.*
"Visual Basic and Visual C# Concepts", Nov. 15, 2004, p. 1, http://msdn.microsoft.com/library/default.asp?url=/library/en-us/vbcon/html/vxconwhatsnewindebugging.asp.
Christopher January, "Logrind 2 A Program Trace Framework", MEng Computing Final Year Individual Project, Jun. 2004, pp. 1-79, http://www.doc.ic.ac.uk/~ajf/Tecahing/Proiects/Distinguished04/ChrisJanuary.pdf.

* cited by examiner

*Primary Examiner* — Charles Ehne
(74) *Attorney, Agent, or Firm* — Wood, Herron & Evans LLP

(57) ABSTRACT

A method utilizes a virtual flight recorder to harvest a subset of events being collected by an active system tracing facility during operation of a computer system. The virtual flight recorder is "virtual" from the sense that it is not specifically instrumented into a component with which the virtual flight recorder is associated, which eliminates the burden on developers to specifically instrument components of interest, and minimizes the impact on system performance as a result of performance metric collection.

4 Claims, 4 Drawing Sheets

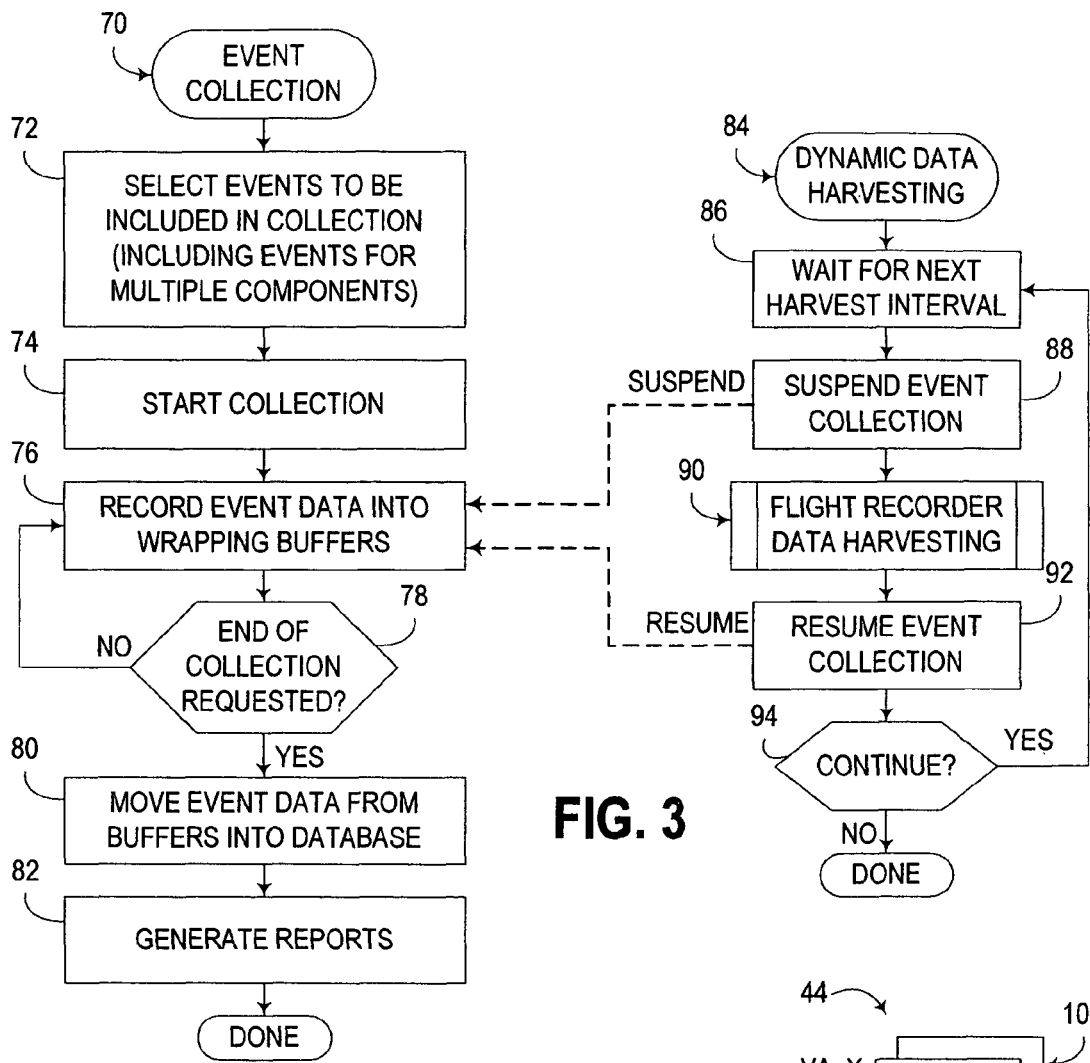
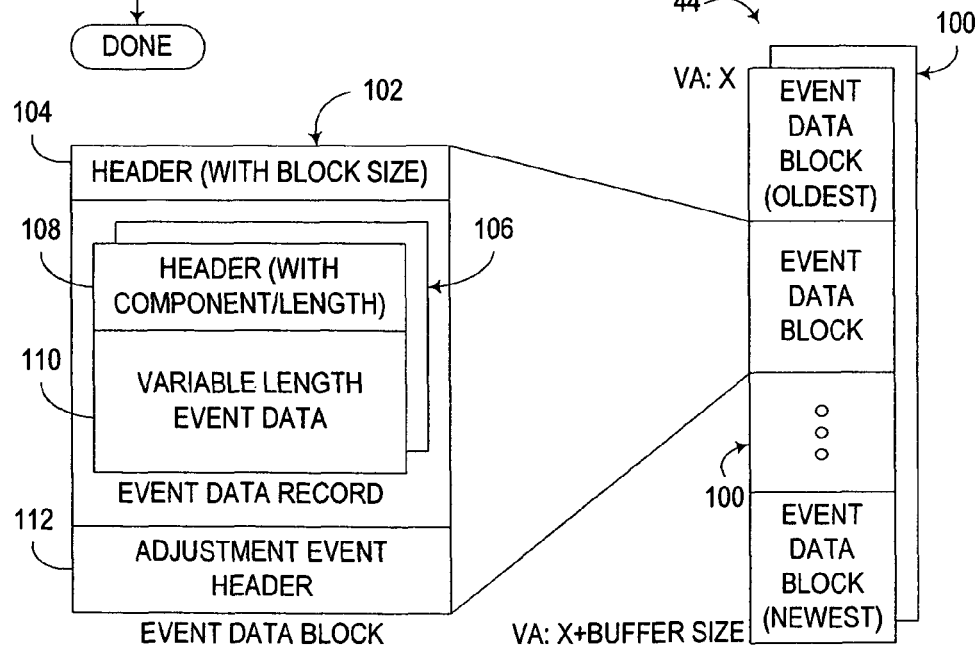

VIRTUAL FLIGHT RECORDER HOSTED BY SYSTEM TRACING FACILITY

FIELD OF THE INVENTION

The invention relates to computers and computer software, and in particular, to collecting computer system performance metrics.

BACKGROUND OF THE INVENTION

As computers become more complex and powerful, monitoring the overall "health" of a computer becomes a greater concern, particularly when problems occur and the causes of those problems need to be identified and resolved. For this reason, a number of techniques have been developed for collecting information, often referred to as performance metrics, relating to the state of a computer during its operation.

For example, one manner of collecting performance metrics relies upon counters and/or timers that are instrumented into a running system and that provide real-time feedback about the number, type and performance of various processes running in a computer and the resources being utilized by those processes. Counters and timers, however, are usually directed to collecting specific pieces of information, and do not provide a comprehensive set of information about the overall performance of a computer or any of its components. Thus, while counters and timers can be useful in identifying problem areas that need to be investigated, they typically do not provide the level of detail needed to solve most problems.

For this reason, many computers often rely on a system tracing facility, which records a historic collection of "events" that occur within a computer. These events are usually implemented by explicit calls from the component software to the system tracing facility, and a user often has the ability to select only certain types of events to trace. Often the amount of data collected by a system tracing facility is exceptionally large, and requires that the events recorded by the system tracing facility be analyzed after the collection is ended, often using relatively sophisticated database query and analysis techniques. Due to the complexity and volume of data, the total elapsed time required from starting a trace to the generation of detailed reports can be significant, e.g., a number of hours, which precludes any generation of results in near real-time.

Another technique that may be used for gathering performance metrics relies on "flight recorders." A flight recorder is typically a simplified, high performance version of a system tracing facility that is dedicated to a specific software component in a computer. The simplified nature typically means that a flight recorder is much more likely to be able to provide near real-time information on a problem.

A flight recorder, as compared to a system tracing facility, generally collects information regarding a relatively small number of events, and often the events are at a comparatively higher level in the hierarchy of the computer system. In addition, the data collected by a flight recorder is typically buffered only on a temporary basis, and is not permanently stored. Control of a flight recorder is typically implemented by the component being monitored, and as a result, little consistency exists between flight recorders for different components in terms of format, content, size, enablement, and data extraction mechanisms.

The general manner in which a flight recorder is typically used is as follows. When it is projected that a performance problem is likely to occur in the near future (e.g., minutes or hours), flight recorders for any suspected components may be started. Then, when a problem in component X is detected (e.g. from counter and/or timer metrics), the component X flight recorder data may be extracted and analyzed to decode the problem. This extracted data is available in near real-time and can be used to take action and drive other decisions in the process of problem determination. Moreover, the flight recorders often continue to run, thus enabling extraction and analysis of data to be repeated as necessary.

Particularly in complex systems like mainframes and other multi-user servers, the software resident in such systems has been thoroughly instrumented to provide a number of performance metric collection capabilities, with instrumentation of the lower levels of software being primarily accomplished through the use of counters/timers and system tracing facilities. However, with the ever increasing demand for immediate problem identification and resolution in enterprise computing environments, there is an increasing need for the types of capabilities provided by flight recorders.

On the other hand, flight recorders are less predominant in many systems, and often require the efforts of the developers of each component of interest to properly integrate a flight recorder into the component. Furthermore, oftentimes the data collected by a flight recorder is redundant with respect to that collected by a system tracing facility, and as a result, the flight recorder in many ways needlessly increases system overhead and decreases system performance.

Therefore, substantial need exists in the art for a manner of improving the collection of performance metrics in a computer, and in particular, for a manner of collecting more comprehensive data for use in diagnosing problems in a running computer in near real-time.

SUMMARY OF THE INVENTION

The invention addresses these and other problems associated with the prior art by providing a method that utilizes a virtual flight recorder to harvest a subset of events being collected by an active system tracing facility during operation of a computer system. The virtual flight recorder is "virtual" from the sense that it is not specifically instrumented into a component with which the virtual flight recorder is associated, which eliminates the burden on developers to specifically instrument components of interest, and minimizes the impact on system performance as a result of performance metric collection.

Consistent with the invention, a computer system is monitored by actively collecting a plurality of events during operation of the computer system using a system tracing facility. A virtual flight recorder is dynamically created during active collection of the plurality of events by harvesting a subset of the plurality of events. The virtual flight recorder includes an interface configured to support user analysis of the subset of events while the system tracing facility is actively collecting events.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the program flow of the performance facilities of FIG. 2 during active event collection and dynamic data harvesting.

FIG. 4 is a block diagram of the organization of data in the performance facilities of FIG. 2.

DETAILED DESCRIPTION

Figure 1:
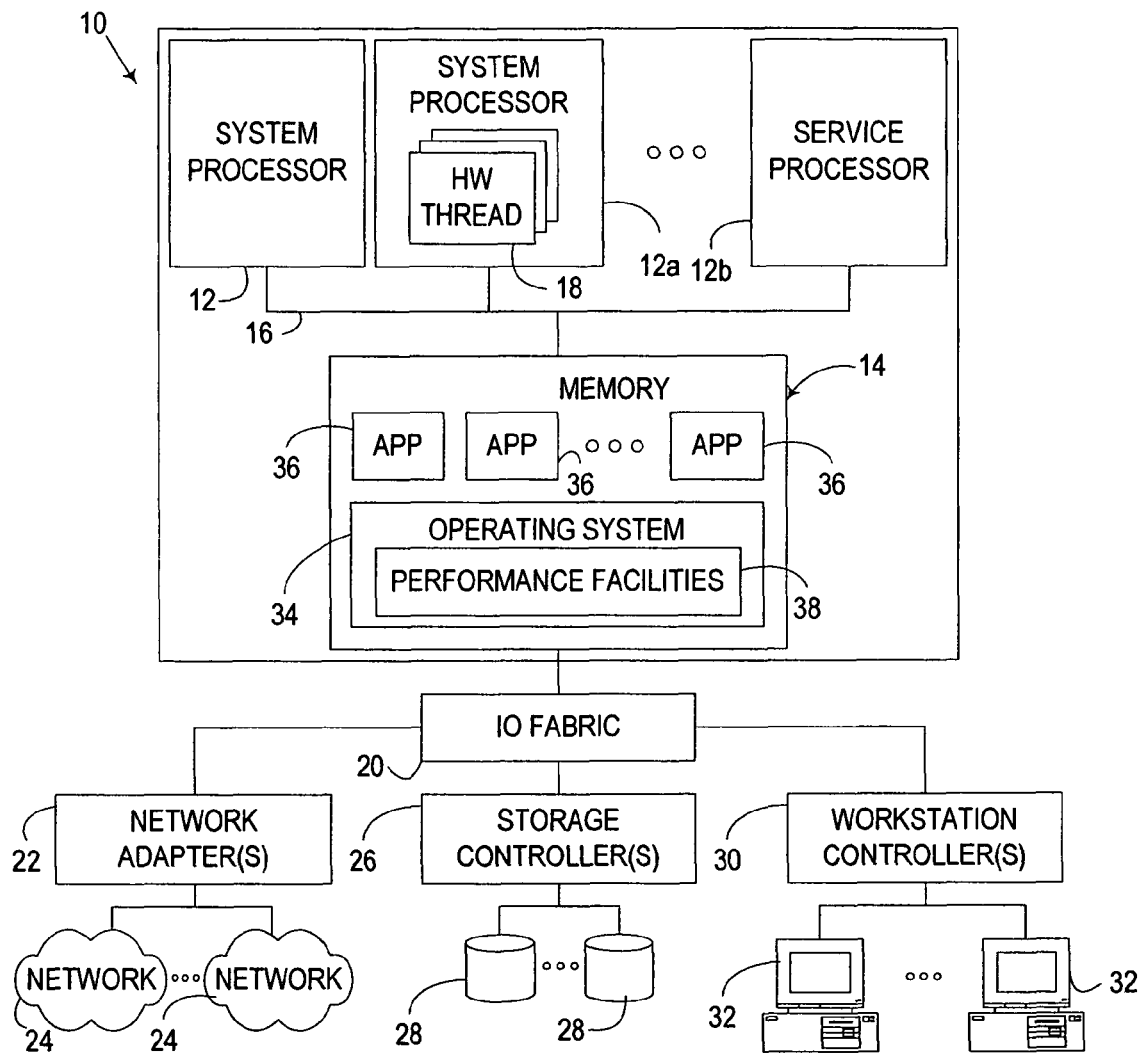
FIG. 1 is a block diagram of the principal hardware components in a computer incorporating performance facilities consistent with the invention.

The embodiments discussed hereinafter utilize "virtual flight recorders" to provide near real-time harvesting and analysis of event data collected by a system tracing facility. The virtual flight recorders may be hosted by a system tracing facility, thus providing both system-wide tracing capabilities and multiple component level flight recorder capabilities in one integrated package. A virtual flight recorder facility may have the ability to harvest selected data from an actively running system tracing facility without the need to stop the trace, thus allowing a wrapping trace collection to be viewed as one or more component flight recorders.

Among other benefits, when used in connection with a system tracing facility such as the Performance Data Collector and Performance Explorer tools in the i5/OS operating system for the eServer iSeries midrange computer from International Business Machines, the existing tracing capabilities of the system tracing facility, such as the extensive instrumentation into a number of system components, can be leveraged to provide component-level performance analysis with little additional overhead. In addition, in some embodiments, virtual flight recorders may be controlled via the same tool, thus providing consistency in terms of data structure, enablement and data extraction methods for different components.

A system tracing facility, in this context, is a facility that records events in a computer system relevant to the overall performance of the computer system. It will be understood by one of ordinary skill in the art that a system tracing facility consistent with the invention is not simply a mechanism for recording program execution paths, as is conventionally associated with trace features supported by conventional debuggers. Instead, a system tracing facility is typically capable of recording a wide variety of events associated with a wide variety of components, including events that are unrelated to program execution paths.

For example, a system tracing facility consistent with the invention may record a wide variety of event types, e.g., storage or memory events such as creating/destroying memory segments, extending memory segments, and allocating/deallocating heap space; disk events such as disk read starts/completes, page read starts/completes, and disk write starts/completes; fault events such as page fault starts; job events such as job stalls, interrupts, and job ineligibility; Java events such as creating/destroying objects, creating destroying threads, locks/unlocks, and garbage collector startup; communication events such as socket operations, TCP/IP communications, and sending/receiving packets; synchronization events such as mutex waits, and unlocks/locks; journal events such as commit starts/ends and rollback starts/ends; resource affinity events; base events such as task switch ins/outs, starting/destroying processes, exceptions, and partition-related events; etc. It should be appreciated that the invention is not limited to this particular combination of events, and that practically any performance-related activity may be recorded by a system tracing facility consistent with the invention. As one example, a system tracing facility such as that implemented in the i5/OS operating system is capable of recording over 200 different types of events.

Moreover, a system tracing facility may collect event data associated with a wide variety of types of components, located within various software layers of a computer system. These components may reside, for example, within applications, device drivers, an operating system, a kernel and/or other software layers. In an IBM i5/OS environment, for example, the types of components that may be instrumented and monitored may include, but are not limited to, components associated with task dispatching, storage management, disk management, network management, resource management, process management, journaling, Java, and work management.

A virtual flight recorder, in this context, refers to a logical entity that emulates a flight recorder for one or more components in a computer system using event data collected by a system tracing facility, and without relying on dedicated instrumentation of those components. Put another way, a virtual flight recorder consistent with the invention is typically capable of providing the type of component-specific data provided by a conventional flight recorder attached to a component, but without relying on dedicated instrumentation of that component to record the component-specific data.

A virtual flight recorder consistent with the invention includes a user interface through which a user may access the component-specific data. A virtual flight recorder may simply harvest event data collected by a system tracing facility and present such data in an unaltered format to a user via the user interface, or in the alternative, at least some component-specific data may be generated or calculated from the harvested event data. For example, conventional flight recorders typically provide component-specific data that is at a higher conceptual level in the computer architecture, whereas a system tracing facility typically records lower level events. As such, it may be desirable in some embodiments to generate higher level component-specific data from the lower level events such that the virtual flight recorder provides information in a more appropriate format for analyzing component-specific performance problems.

As an example, a Task Switch Out Queue event collected by a system tracing facility in an IBM i5/OS environment may contain over 200 bytes of data, and can include information such as a timestamp, a blocking object, a reason for the block, a code address calling the block, and up to 16 additional code addresses that identify a tree of calling procedure addresses. This amount of data may be appropriate when applying detailed, lengthy performance analysis techniques; however, when viewing this event from within a virtual flight recorder, a higher level, and less detailed, representation of this data may be more appropriate. As such, it may be desirable to present such an event as simply containing a timestamp, a block reason, and one code address representing the block point.

Turning now to the Drawings, wherein like numbers denote like parts throughout the several views, FIG. 1 illustrates the principal hardware components in an apparatus 10 capable of implementing virtual flight recorders consistent with the invention. Apparatus 10 is illustrated as a multi-user computer, and may generically represent, for example, any of a number of multi-user computers such as a network server, a midrange computer, a mainframe computer, etc., e.g., an IBM eServer iSeries computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). Apparatus 10 will hereinafter also be referred to as a "computer," although it should be appreciated the term "apparatus" may also include other suitable programmable electronic devices consistent with the invention.

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. In addition, one or more of processors 12 (e.g., processor 12b) may be implemented as a service processor, which is used to run specialized firmware code to manage system boot up (also referred to as system initialization or initial program load (IPL)), and to otherwise monitor, diagnose and configure system hardware.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

Computer 10 operates under the control of an operating system 34, and executes or otherwise relies upon various computer software applications, components, programs, objects, modules, data structures, etc., e.g., one or more applications 36. In addition, operating system 34 includes various performance facilities indicated at 38, including a system tracing facility capable of hosting one or more virtual fligh recorders consistent with the invention.

Additional applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network. In addition, computer 10 may be implemented as a logically-partitioned computer, whereby multiple partitions, each with a separate operating system, are resident in the computer.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
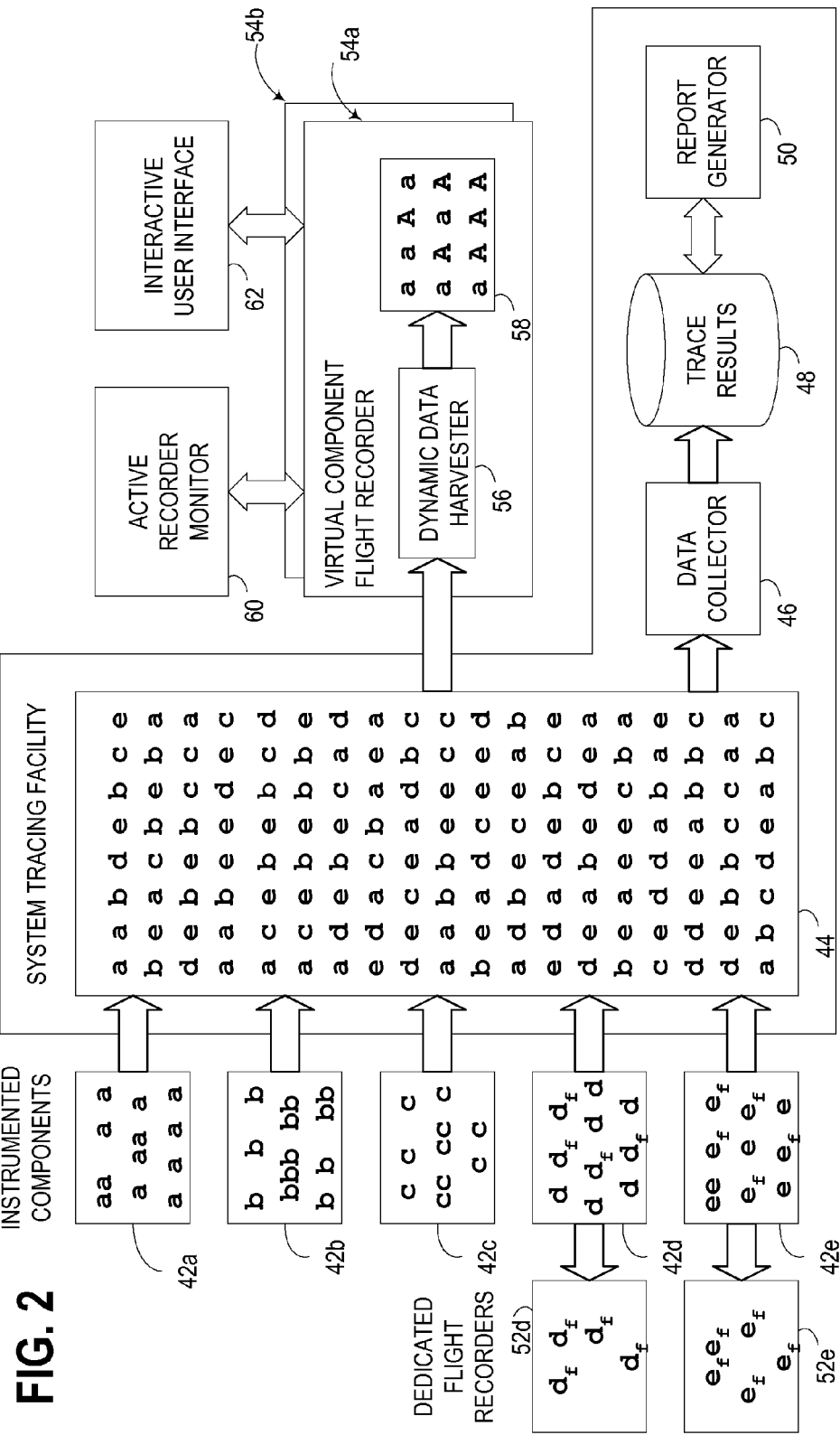
FIG. 2 is a block diagram of the performance facilities referenced in FIG. 1.

FIG. 2 next illustrates performance facilities 38 in greater detail. In particular, facilities 38 includes a system tracing facility 40 that, similarly to conventional system tracing facilities, actively collects event data from a plurality of instrumented components 42a-42e into a buffer data structure 44. Letters a-e shown in components 42a-42e represent instrumented locations in the corresponding components, with event data collected from such instrumented locations represented by corresponding letters a-e in data structure 44.

After an active trace is complete using system tracing facility 40, a data collector 46 moves the event data into a trace results database 48. It will be appreciated that, due to the large volume of collected event data, the storing of event data in database 48 may take several minutes to several hours to complete. Moreover, after the data is stored in database 48, a report generator 50 is able to issue queries to database 48 and generate one or more trace reports, as desired.

It will be appreciated that components 42a-42e are principally instrumented for event data collection by system tracing facility 40, and are not specifically instrumented for the purposes of collecting component-specific data such as with conventional flight recorders. Nonetheless, it will also be appreciated that in some embodiments some components may still be specifically instrumented for attachment of conventional flight recorders, e.g., as illustrated by flight recorders 52d and 52e, which collect component-specific data at instrumented locations $d_f$ and $e_f$ in components 42d and 42e.

Consistent with the invention, one or more virtual flight recorders, such as virtual flight recorders 54a and 54b, may be attached to system tracing facility 40 for the purpose of harvesting component-specific performance-related data pertaining to specific components in the system. Virtual flight recorder 54a, for example, is configured for harvesting event data pertaining to component 42a, using a dynamic data harvester 56 that harvests event data a from data structure 44 during active collection of event data by system tracing facility 40, and stores the harvested data in a component-specific data structure 58. As noted above, virtual flight recorder 54a may harvest component-specific event data in an unaltered manner, or in the alternative, may generate additional component-specific data (represented by upper case letters A) from the harvested event data.

Facilities 38 additionally includes at least one user interface for interacting with a virtual flight recorder. For example, a programmatic user interface such as an API may be provided to enable an active recorder monitor 60 to initiate requests to create a virtual flight recorder for a specific component, and thereafter retrieve component-specific data therefrom. As another example, an interactive user interface 62 may be provided in addition to or in lieu of a programmatic user interface to enable a user, such as a developer or systems administrator, to create a virtual flight recorder and interactively query the flight recorder for component-specific data.

It will be appreciated that virtual flight recorders may be created dynamically and on demand in some embodiments, such that whenever a user wishes to obtain component-specific data about a particular component, the user is required to request that a virtual flight recorder be created. In the alternative, one or more virtual flight recorders may be created independent of any particular user request, such that interaction with a virtual flight recorder is limited to querying the virtual flight recorder for harvested data.

Moreover, it will be appreciated that each virtual flight recorder may have a separate user interface, or in the alternative, a user interface may be supported to interact with multiple virtual flight recorders. In either event, it is desirable in many embodiments to support consistent user interfaces for all virtual flight recorders, thus avoiding the deviations that ordinarily are experienced with conventional flight recorders that are specifically instrumented into particular components.

Each user interface typically supports the ability for a user or monitor to retrieve component-specific data from a virtual flight recorder, and if necessary, request additional data. For example, in the case of an active monitor 60, it may be desirable to support the ability for the monitor to periodically, or in response to a detected performance problem, create a virtual flight recorder and retrieve an initial set of component-specific data therefrom, and then based upon the analysis of that data, retrieve more detailed component-specific data to assist with the analysis and resolution of a performance-related problem. Other manners of interacting with a virtual flight recorder, e.g., to provide additional functionality similar to some conventional flight recorders, may also be supported consistent with the invention.

FIG. 3 next illustrates the program flow of performance facilities 38 during active event collection and dynamic data harvesting on behalf of a virtual flight recorder in a manner consistent with the invention. Specifically, FIG. 3 illustrates an event collection routine 70 that performs a system trace in much the same manner as a conventional system tracing facility. Specifically routine 70 may be initiated in response to a request to start an active collection, and begins at block 72 by selecting the types of events to be included in the collection, typically in response to user input. In addition to selecting particular types of events, the selected events may also be limited to events associated with a subset of components in the system. Next, the collection is started in block 74, which thereafter initiates a loop in block 76 where event data is recorded and stored in one or more wrapping buffers during the operation of the system until ending the collection is requested and detected in block 78. Thereafter, in block 80, the event data collected in the wrapping buffers is moved into database 48 by data collector 46 (FIG. 2), and one or more reports are generated in block 82 by report generator 50 (FIG. 2).

It will be appreciated that, in many instances, ending a large collection, storing the data, and generating the reports can take several hours to process. In the event, however, that a user wishes to access the collected data sooner, e.g., in near real-time, the user is permitted to utilize the herein-described virtual flight recorders to provide more immediate access to the collected data.

Specifically, as illustrated by dynamic data harvesting routine 84, which may be executed, for example, by a dynamic data harvester 56 (FIG. 2) after a virtual flight recorder has been created, data collected by a system tracing facility can be harvested in at least a near real-time manner to provide user access to the data while an active collection is still underway. In the embodiment illustrated in FIG. 3, routine 84 is configured to periodically harvest relevant event data being collected by system tracing facility 40. As such, routine 84 begins in block 86 by waiting for a next harvest interval. At the next interval, control passes to block 88 to temporarily suspend active event collection by system tracing facility 40. Next, a flight recorder data harvesting routine 90 is called to harvest component-specific data stored in the wrapping buffers, and thereafter, active event collection is resumed in block 92. Next, if it is determined that harvesting of data should continue, block 94 returns control to block 86 to wait for a next harvest interval. Otherwise, routine 84 is complete.

It will be appreciated that in some embodiments, a user interface may access the harvested component-specific data concurrently with dynamic data harvesting in routine 84, while in other embodiments, it may be desirable to enable harvested data to be accessed only after harvesting is complete. It will also be appreciated that in other implementations, no suspension of active event collection may be required during the dynamic data harvesting by routine 84. Moreover, it will be appreciated that in other implementations, dynamic data harvesting may be performed for a single period of time, rather than at specific intervals. Other modifications will be apparent to one of ordinary skill in the art having the benefit of the instant disclosure.

Returning briefly to FIG. 2, event data may be stored in data structure 44 in a number of different manners consistent with the invention, and the manner in which event data is stored may affect how harvesting is accomplished on behalf of a virtual flight recorder. For example, FIG. 4 illustrates one suitable implementation of data structure 44 where a plurality of wrapping trace data buffers 100 are organized into variable size event data blocks 102, where each event data block includes a header 104 (which includes an indication of the size of the block), one or more event data records 106, each with a header 108 containing component and length information and variable length event data 110, and an optional adjustment event header 112 to pad the block to align with a particular size boundary. Each event record represents a distinct event, and it is also desirable to store a timestamp for each event data record at a fixed location in each event data record.

In the illustrated embodiment, each trace data buffer is re-mapped with a virtual address range such that the oldest event data block contains the lowest address and the most recent event data block contains the largest virtual address. By doing so, a binary search for the starting and ending blocks may be simplified since the block addresses ascend in time order and the block addresses are on "block size" address boundaries. Moreover, by grouping the event data in blocks, virtual flight recorder event data harvesting is allowed to quickly find the events meeting the user requested time period. Locating the timestamp of the first event often may be accomplished simply by accessing a fixed offset (based on the header size and the location of the timestamp in each event record) into the beginning of the block.

It will be appreciated that other data structures and data organizations may be used in the alternative.

Figure 5:
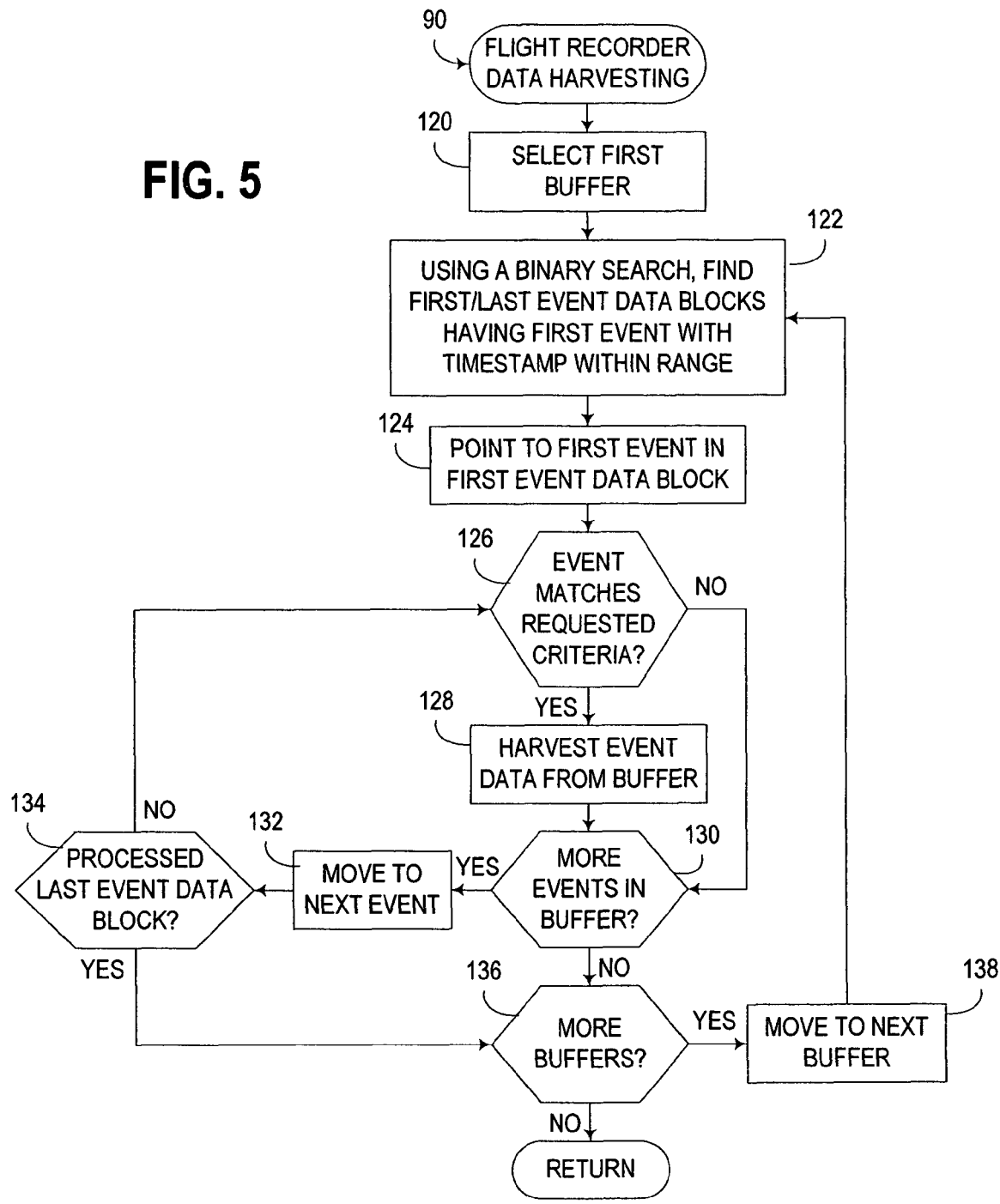
FIG. 5 is a flowchart illustrating the program flow of the flight recorder data harvesting routine referenced in FIG. 3.

Now turning to FIG. 5, flight recorder data harvesting routine 90, which presumes the data structure implementation of FIG. 4, is illustrated in greater detail. Routine 90 begins in block 120 by selecting the first wrapping trace data buffer 100. Block 122 then performs a binary search of the first buffer 100 to find the first and last event data blocks having a first event in the block with a timestamp within a desired range (where the range may be based upon, for example, the harvesting interval or a particular time interval specified by a user or active monitor). Block 124 then points to the first event record in the first event data block located in the binary search, and block 126 determines whether the event represented by the event record matches the requested criteria (e.g., whether the event matches the component(s) with which the virtual flight recorder is associated, and optionally any event type restrictions). If so, the relevant event data is extracted from the buffer in block 128 and stored in a buffer for the virtual flight recorder.

Upon completion of block 128, or if block 126 determines that the event does not match the requested criteria, control passes to block 130 to determine if more events in the buffer remain to be processed. If so, control passes to block 132 to move to the next event record, or if no more event records remain in the current event block, to the first event record in the next event block.

Block 134 next determines if the last event data block has been processed. If not, control passes to block 126 to process the next event. Otherwise, if the last event data block has been processed, block 134 passes control to block 136 to determine if more buffers remain to be processed. If not, routine 90 is complete. Otherwise, block 136 5 passes control to block 138 to move to the next buffer to process any additional event data blocks within the desired range. Also, returning to block 130, if it is determined that no more events remain to be processed in a buffer, control passes to block 136 to process any additional buffers (if necessary).

It will be appreciated that through the use of dynamic data harvesting as described herein, the extraction of component-specific data from wrapping trace data buffers being filled by an active event collection may take only at the most several seconds, and still enable active event collection to continue to run after the extraction has been completed. As such, a virtual flight recorder permits near real-time analysis and problem resolution may be performed using event data collected by an actively running system tracing facility, typically for any component instrumented for use with the system tracing facility, and even when the that component has not been specifically instrumented for the collection of component level flight recorder data.

Various additional modifications will be apparent to one of ordinary skill in the art. Therefore, the invention lies in the claims hereinafter appended.

What is claimed is:

1. A method of monitoring a computer system, the method comprising:
    actively collecting a plurality of events associated with a plurality of components in the computer system during operation of the computer system using a system tracing facility;
    during active collection of the plurality of events, dynamically creating a virtual flight recorder for harvesting a subset of the plurality of events for a first component from the plurality of components, wherein the subset of events are less than the collected plurality of events, the virtual flight recorder including an interface configured to support user analysis of the subset of events for the first component, while the system tracing facility is actively collecting events associated with the plurality of components; wherein dynamically creating the virtual flight recorder includes harvesting the subset of events for the first component from events associated with the first component such that the interface supports user analysis of the first component, and wherein harvesting the subset of events for the first component is performed without any dedicated instrumentation of the first component; and
    responding to user input directed to the interface to provide near real-time analysis of the subset of events, including near real-time analysis of the first component from the plurality of components.

2. The method of claim 1, wherein dynamically creating the virtual flight recorder is performed without interrupting the active collection of events by the system tracing facility.

3. The method of claim 1, wherein dynamically creating the virtual flight recorder includes temporarily suspending the active collection of events by the system tracing facility, harvesting the subset of events from at least one buffer that stores events collected by the system tracing facility, and resuming the active collection of events by the system tracing facility after harvesting the subset of events.

4. The method of claim 1, wherein each of the plurality of events is selected from the group consisting of a memory event, a disk event, a fault event, a job event, a Java event, a communication event, a synchronization event, a journal event, a resource affinity event, a base event, and combinations thereof.

* * * * *